United States Patent Office 2,761,786
Patented Sept. 4, 1956

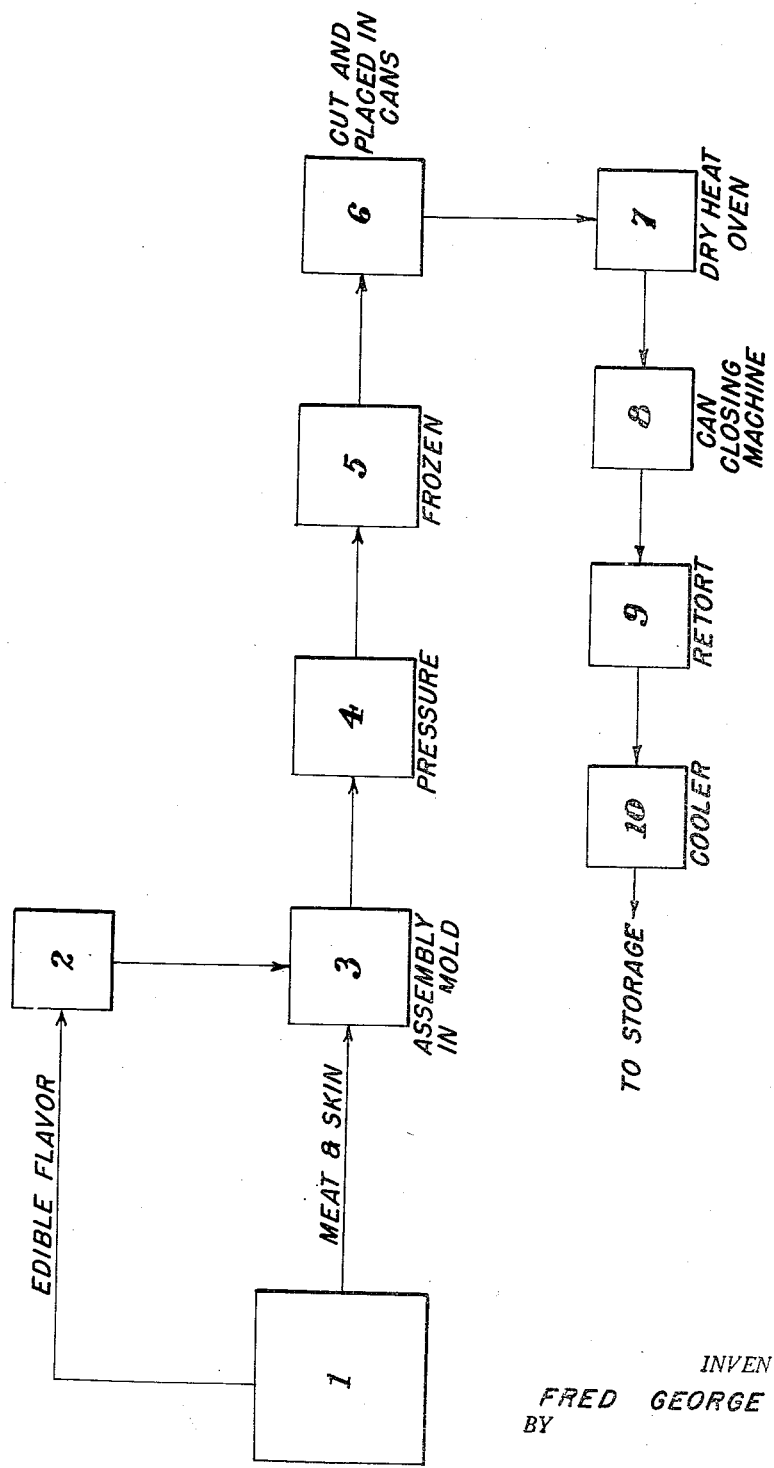

2,761,786

CANNED TURKEY PRODUCT AND METHOD OF PREPARING SAME

Fred George, Berkeley, Calif., assignor of one-half to Norbest Turkey Growers Association, Salt Lake City, Utah Application January 5, 1953, Serial No. 329,665

9 Claims. (Cl. 99—187)

This invention relates to food products and, more particularly, to improvements in the art of canning turkey meat and processes for producing same.

The invention is in the nature of a continuation in part of my copending applications Serial No. 136,544, for Turkey Product and Method of Preparing Same, filed January 3, 1950, now United States Letters Patent No. 2,640,779, and Food Product and Method of Preparing Same, Serial No. 219,845, filed April 7, 1951.

The principal object of the present invention is to provide a canned turkey product which contains and retains the natural full roast turkey flavor.

Conventional procedure in the past in canning turkey meat has been to submit whole processed turkeys to a degree of full cooking in order to facilitate removal of the meat from the bones. After the meat has been removed, it is then placed in a can, additional moisture added and the can be then closed, sealed and placed in a steam retort for sterilization. The resultant product has a soft mushy texture having undesirable, unappetizing appearance and with an attendant loss of natural flavor. Instead of the natural full roasted flavor the product is said to have a salmon or fishy flavor.

It is an object of the present invention, then, to overcome the previous problems attendant to the successful canning of turkey meat and to provide a canned product which is not only of wholesome appearance but which has the natural characteristic full roast turkey flavor and wherein the meat is formed into a relatively solid and cohesive log or loaf. The terms "log" or "loaf" as used herein may refer to a product of cylindrical or other shape.

A principal object of the product of the present invention is to form the turkey meat into a cohesive shaped mass which remains substantially intact during canning so that the canned product may be uniformly and conveniently sliced and proportioned for serving.

The canned product may be removed intact from the can, sliced and served cold, or may be removed from the can and heated in an oven for hot serving, or, alternatively, may be heated in the can, thence removed and served hot. Thus kitchen preparation is reduced to a minimum.

The process of producing the new canned product contemplates the production of turkey meat in the manner taught in my said Patent No. 2,640,779 and co-pending application Serial No. 219,845, namely, raw dark and white meat are removed from the turkey carcass. The skin of the carcass is removed, tendons and all bones are removed. The part of the turkey defined by the crop and the interior medial portion of the pectoral muscles, consisting of skin, fatty tissue and flavor glands, is removed. Hereinafter in the specification and claims the subject flavor area and/or components thereof will be referred to as "edible flavor" and shall be deemed to include all the components of the subject area or flavor glands alone or together with one of the other components. The boneless, tendon-free turkey meat is formed into a desired shape, such as a cylindrical loaf. The edible flavor is spread throughout the log to impart a substantial conformity of flavor and texture. The meat and edible flavor are wrapped in carcass skin, subjected to pressure and quick frozen.

The steps of the method of preparing the new canned food product will now be described. Reference may be made to the figure which illustrates, by flow sheet representation, the stations or steps included in the preferred method. The steps of formation of the raw turkey meat prior to canning are fully disclosed in my aforesaid Patent No. 2,640,779 and copending application Serial No. 219,845, and thus will be referred to generally in this specification which follows:

The raw meat, edible flavor and skin are removed from the carcass, separated and all bones and tendons are removed at a station or stations, indicated generally at 1. The edible flavor is chilled and ground at a station or stations 2. The skin, meat and edible flavor are assembled at the station or stations 3 into a desired shape in conformity with the can in which the product is to be placed. For example, if the can diameter in which the product is to be packed is four inches, the meat, skin and edible flavor are assembled and placed in a mould at station 3 to form the same into a round log or loaf, which, when compressed as will hereinafter be described, will have a diameter of slightly less than the four inch diameter of the can within which it is to be placed. At station or stations 3 the meat is generally layered into a mould over a piece of carcass skin and the edible flavor, which has been chilled and ground, is spread uniformly throughout the assembled meat and skin to impart a uniformity of texture and flavor.

Ordinarily a piece of turkey skin is placed in the mould, edible flavor is sprinkled or spread over the same, a layer of dark or white meat is then laid over the skin and then another layer of dark or white meat. Edible flavor may be spread or sprinkled between the layers and/or around the assembled layers of meat and a further wrapping of skin may then be added around the assembled layers of meat and edible flavor so that the product is formed with at least one-half of its surface wrapped in turkey skin.

The mould in which the components are assembled is then subjected to pressure in the order of preferably between 1000 to 2000 pounds per square inch and the mould sections are locked under pressure at a station or stations designated at 4. Thereafter the mould is placed in a freezer and hard frozen at a station 5.

After freezing, the frozen product may be removed from the mould and cut in lengths at station 6 to fit the height of the can within which it is to be placed, leaving sufficient head room to compensate for moisture expansion when subsequently subjected to sterilization temperatures.

If, for example, the product is to be canned in a No. 2½ can, which has a diameter of 4³⁄₁₆ inches and a height of 4¹¹⁄₁₆ inches, the compressed, frozen product has been moulded to have a diameter of slightly less than 4³⁄₁₆ inches. The moulded product is cut into sections less than 4¹¹⁄₁₆ inches in length. The length should be sufficiently less than 4¹¹⁄₁₆ inches to allow head room for expansion of the moisture content of the canned product when subjected to retorting. For example, in a No. 2½ can the head room would be approximately ¼ inch.

The purpose of freezing under pressure the formed meat is to facilitate cutting and insure that the product is retained in a cohesive mass. If desired the product can be molded initially in the size and shape of its container, thus omitting the cutting step.

After placing the frozen or near frozen product in a can the can is left open and placed in a dry hot oven, indicated at station 7. The open can is subjected to oven temperature of approximately between 175° F. to 200° F. for a sufficient time to bring the internal temperature of the product up to approximately 150° F. The purpose of this step is to draw the natural juices and moisture from the product into the can and is important to the success of the product and process.

The can is then removed from the dry heat oven and fed through a conventional vacuum sealing closure machine indicated at station 8. After closing, the can containing the product is placed in a conventional retort for pasteurization and sterilization. The retort is indicated at station 9. The canned product remains in the retort through a cycle of time to bring the internal temperature of the canned product to approximately 250° F. The canned product is thereafter removed from the retort and cooled as at station 10. After cooling, the product may then be stored or packed for shipment.

The present process provides an end product of turkey meat which has all of the natural flavor of a whole roasted turkey. The meat and components are retained in a cohesive form to facilitate slicing and proportioning control.

The invention contemplates production of a loaf or log of turkey meat containing approximately equal parts of dark and white meat, approximately 3% by weight of edible flavor and 8% by weight of turkey skin. The formation of the mentioned product is fully described in my aforesaid pending applications. The subjection of the assembled meat, skin and edible flavor to pressure and freezing forms the product into a solid cohesive mass which does not separate markedly during canning and subsequent serving. It is essential that the product be placed in an open can, brought to an internal temperature of approximately 150° F. in order to draw the juices from the contained meat before closing and sterilizing.

I claim:

1. A process of preparing canned turkey meat comprising assembling the turkey meat in layers, adding uniformly edible flavor, forming said turkey meat and edible flavor into a desired shape, applying pressure to the assembled turkey meat and edible flavor, freezing said meat and edible flavor while under pressure, placing said meat and edible flavor in an open can, subjecting said filled open container to dry heat for a time sufficient to draw out the natural juices of the product, the product being heated to an internal temperature of approximately 150° F., then sealing said can, and then sterilizing for a time sufficient to cook said product.

2. The method according to claim 1 and wherein the product is heated to an internal temperature of approximately 250° F. during the sterilizing step.

3. A method according to claim 1 and wherein the turkey meat and edible flavor are wrapped in turkey carcass skin.

4. A method according to claim 3 and wherein the product is heated to an internal temperature of approximately 150° F. during the first heating step.

5. A method according to claim 3 and wherein the product is heated to an internal temperature of approximately 150° F. during the first heating step and to an internal temperature of approximately 250° F. during the sterilizing step.

6. A process of preparing canned turkey meat comprising assembling the turkey meat in layers, adding uniformly edible flavor, forming said turkey meat and edible flavor into a desired shape, placing said meat and edible flavor in an open can, subjecting said filled open container to dry heat for a time sufficient to draw out the natural juices of the product, the product being heated to an internal temperature of approximately 150° F., then sealing said can, and then sterilizing for a time sufficient to cook said product.

7. A method according to claim 6 and wherein the product is heated to an internal temperature of approximately 250° F. during the sterilizing step.

8. A canned turkey meat product made in accordance with the process of claim 2.

9. A canned turkey meat product made in accordance with the method of claim 5.

References Cited in the file of this patent
UNITED STATES PATENTS

| | | |
|---|---|---|
| 1,740,176 | Hormel et al. | Dec. 17, 1929 |
| 2,640,779 | George | June 2, 1953 |